F. H. BEROLD.
PRINTER'S BLOCK.
APPLICATION FILED NOV. 28, 1913.
1,107,648.
Patented Aug. 18, 1914.
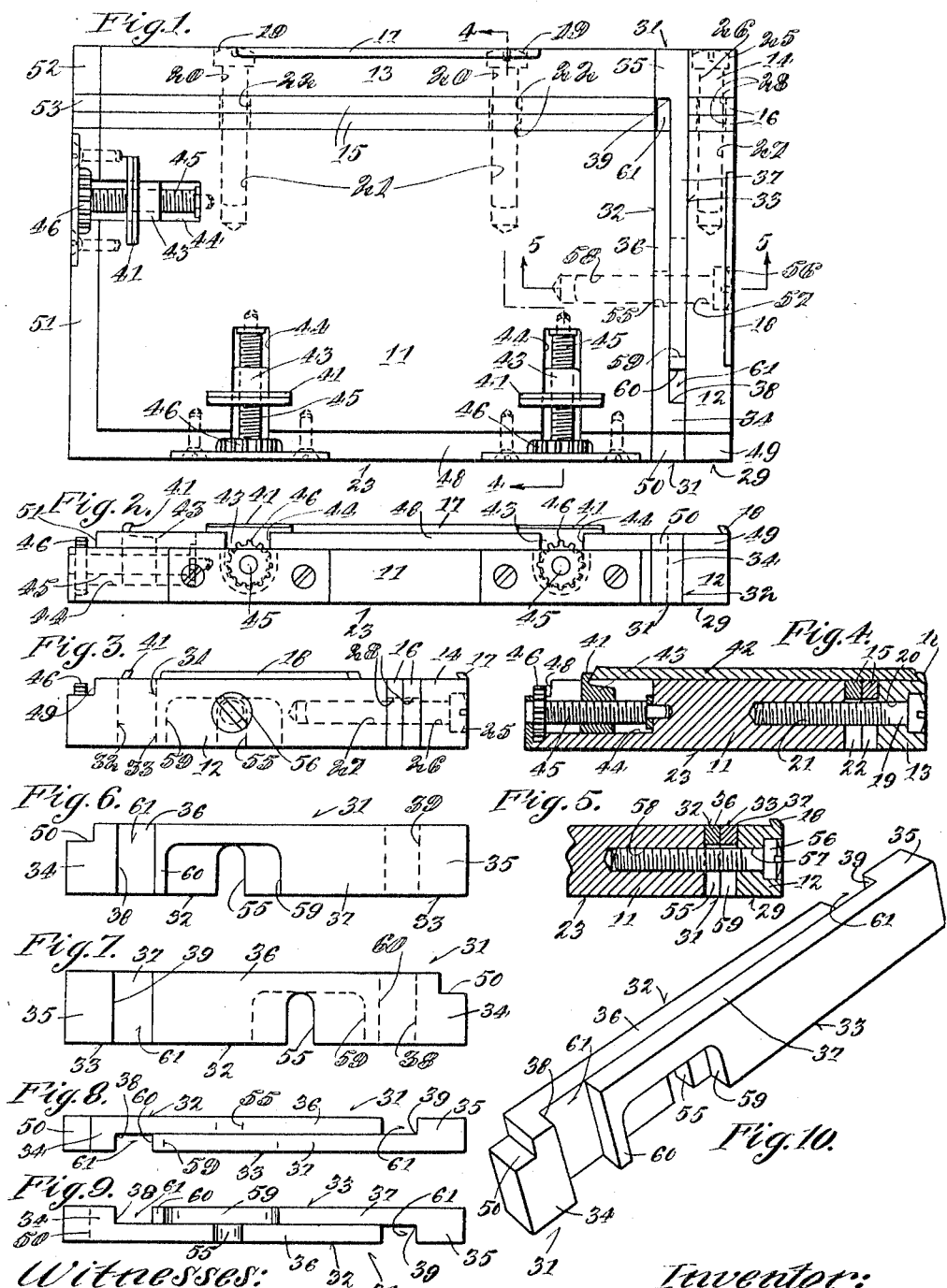
Witnesses:
Jacob A. Hollander
Theresa M. Silber
Inventor:
Frederick H. Berold,
by his Attorney

UNITED STATES PATENT OFFICE.

FREDERICK H. BEROLD, OF WYOMING, OHIO.

PRINTER'S BLOCK.

1,107,648. Specification of Letters Patent. Patented Aug. 18, 1914.

Application filed November 28, 1913. Serial No. 803,563.

*To all whom it may concern:*

Be it known that I, FREDERICK H. BEROLD, a citizen of the United States, residing at Wyoming, in the county of Hamilton and State of Ohio, have invented certain new and useful Improvements in Printers' Blocks, of which the following is a specification.

My present invention is an improvement upon the printer's block shown and described and claimed in my application for patent, Serial No. 665,065, filed December 11, 1911, and has for its object the provision of means whereby the printer's block may be made more readily adjustable.

It is a further object of my invention to provide a novel extensible insert-strip capable of employment in printers' blocks of the character of that described in my aforesaid application, and the invention will be further readily understood from the following description and claims, and from the drawing in which latter:

Figure 1 is a plan view of my improved device. Fig. 2 is a side view of the same. Fig. 3 is an end edge view of the same. Fig. 4 is a vertical cross-section taken on the irregular line 4—4 of Fig. 1. Fig. 5 is a vertical longitudinal section taken on the line 5—5 of Fig. 1. Fig. 6 is a front side elevation of the extensible insert-strip shown in partly extended relation. Fig. 7 is a rear side elevation of the same. Fig. 8 is a plan view of the same. Fig. 9 is a bottom view of the same; and, Fig. 10 is a perspective view of the same.

11 and 12 are primary blocks, and 13, 14, are supplemental blocks. Insert-strips 15 are arranged to be inserted between the blocks 11 and 13 and insert-strips 16 are arranged to be inserted between the blocks 12 and 14. One or more of these insert-strips may be employed in each instance. There is a plate-retaining lip 17 on the supplemental block 13 and a plate retaining lip 18 on the primary block 12.

A clamping screw 19 is received through a hole 20 in the supplemental block 13 and into a threaded hole 21 in the primary block 11. Two of these screws are shown. The insert-strips 15 are provided with bottomless recesses 22 for being readily received over the screws, as more clearly shown in my aforesaid application. The screws clamp the primary block 11, supplemental block 13 and insert-strips 15 together for forming a main block-section 23.

A screw 25 is received through a hole 26 in the supplemental block 14, similar to the hole 20, and through a threaded hole 27 in the primary block 12, similar to the threaded hole 21. The insert-strips 16 are provided with bottomless recesses 28, similar to the bottomless recesses 22, for being readily received over the screw. The primary block 12, supplemental block 14 and the insert-strips 16 are clamped together by the screw 25 for forming a main block-section 29.

The main block-sections 23 and 29 are extensible to equal extent by having one or more of the insert-strips between the primary blocks and the supplemental blocks of the respective main block-sections inserted between them, and clamping the parts of the respective main block-sections together by means of the clamp-screws. The insert-strips 15 are preferably of a length equal to the primary block 11 and supplemental block 13 and the insert-strips 16 are preferably of a length equal to the width of the primary block 12 and supplemental block 14. The block-section 29 is preferably auxiliary to the block-section 23.

Extension of the printer's block in a direction at right angles to the extensions provided for the main block-sections is obtained by means of extensible insert-strips extensible in length for being adjusted to a length which is equal to the distance between the outer side faces of the primary block and supplemental block after extension thereof by insertion of the insert-strip or strips between them. One or more of these extensible insert-strips may be employed.

The construction of these extensible insert-strips is such that their width will be maintained when extended in length, so as to maintain proper distance between all parts of the main block-sections when the same are in connected relation, and means are provided in the extensible insert-strips for permitting the clamping together of the main block-sections irrespective of the extended arrangement of the parts of the extensible insert-strips to fit said main block-sections.

31 is an extensible insert-strip which comprises the members 32, 33. The outer end portions 34, 35, of these extensible insert-strip members are of equal width and have shanks 36, 37, extending inwardly therefrom, these shanks being collectively of a width equal to the width of said outer end portions, the shanks extending from opposite sides of said outer end portions when in operative relation between the main block-sections. Shank-receiving rabbets 38, 39, are thus formed in each of the insert-strip members, the rabbets of each insert-strip member receiving the shank of its mating insert-strip member.

The primary block 11 is provided with adjustable lips 41 for clamping the printer's plate 42 between said adjustable lips and the lips 17 and 18. The lips 41 are shown on slides 43 received in slots 44 in the primary block 11 and adjusted by means of adjusting screws 45 having toothed wheels 46 thereon, the said adjusting screws having threaded connections with said slides. The adjusting screws are suitably journaled in the plate.

The primary block 11 is provided with a rabbet 48. The primary block 12 is provided with a rabbet 49 and the outer end portion of the extensible insert-strip member 32 is provided with a rabbet 50 for forming a continuous rabbet for permitting a usual rack-strip to be moved lengthwise thereof throughout the length of the form for operating all of the wheels 46 in line therewith.

The primary block 11 is provided with a rabbet 51, the supplemental block 13 is provided with a rabbet 52 and each of the insert-strips 15 is provided with a rabbet 53, these rabbets being in line with the wheel 46 extending crosswise of said rabbets, so that the rack-strip may be passed longitudinally of all said mating rabbets for clamping the plates on their several blocks.

One of the insert-strip members, shown as the member 32, is provided with a recess 55, preferably bottomless for forming a bottomless slot, whereby said insert-strip member is received over a clamping screw 56 journaled in a hole 57 in the primary block 12 and threaded into a threaded hole 58 in the primary block 11. The side walls of the slot 55 are received against the screw for positioning the insert-strip member containing said slot in fixed relation crosswise of the main block-sections so that its rabbet 50 may register with the rabbets 48 and 49. The insert-strip member 33 is provided with an opening 59, preferably bottomless, whereby a narrow end wall 60 is formed at the end of the shank 37. The parts 55, 59, form downwardly opening mouths. The screw 56 is received through said opening 59 and through said slot 55, and the parts are so arranged that the insert-strip member 33 may be moved lengthwise of the insert-strip member 32 for adjusting the extensible insert-strip 31 to a length equal to the width to which the main block-sections 23 and 29 may have been adjusted. The construction is such that the wall of the opening 59 adjacent to the end-portion 35 and the narrow wall 60 will at all positions of adjustment rest against the shank of the insert-strip member 36 for finding support, whereby effective clamping together of the main block-sections with the extensible insert-strips between them is effected.

The insert-strips are preferably of the height of the block-sections for supporting the printer's plate, and the extensible insert-strips are of such form that continuous support is obtained for the edges of the printer's plate at the edges of the composite printer's block, the intermediate portion of the plate preferably having continuous support except for the slight spaces 61 between adjacent extensible insert-strip members and the adjacent plate-supporting faces of the main block-sections.

Having thus fully described my invention, what I claim as new and desire to secure by Letters Patent, is:

1. A four cornered printer's block comprising a plate-supporting block at each corner of said printer's block, and insert-strips received in crossing relation at substantially right angles to each other between said plate-supporting blocks for adjusting diagonally opposite ones of said plate-supporting blocks toward and from each other in directions both of the length and of the width of said printer's block, said insert-strips extending in one direction being extensible and each of which comprises insert-strip members, each of said members having an outer end and an inwardly extending shank, said shanks located side by side, the width of each of said outer ends being equal to the collective width of a pair of the shanks of said members.

2. A printer's block comprising a pair of main composite sections, each section being made up of primary and supplemental blocks with insert-strips between them, and an extensible insert-strip located between said main composite sections, said extensible insert-strip comprising a pair of members each having an outer end and an inwardly extending shank, each of said outer ends being of a width equal to the width of said collective shanks, and arranged for lengthwise adjustment between said sections.

3. In combination, a printer's block comprising a plurality of main block-sections each of which comprises a primary block, a supplemental block and an insert-strip or strips between them and means for clamping said blocks and insert-strips of each of said block-sections together, an extensible insert-strip extending crosswise of said first-named insert-strip or strips between said main block-sections, said extensible insert-strip comprising outer ends and inwardly extending shanks, said respective outer ends and said collective shanks being of substantially equal width, and said main block-sections and one of said outer ends provided with rabbets, said rabbets located in line with each other.

4. In combination, a printer's block comprising a plurality of main block-sections each of which comprises a primary block, a supplemental block, and an insert-strip or strips between them, and means for clamping said blocks and insert-strip or strips of each of said block-sections together, an extensible insert-strip extending crosswise of said first-named insert-strips between said main block-sections, said extensible insert-strip comprising a pair of members, said main block-sections and the outer end of one of said extensible insert-strip members provided with rabbets, said rabbets located in line with each other, a screw for clamping said main block-sections and extensible insert-strip members together, said extensible insert-strip member provided with said rabbeted outer end having a recess the walls whereof impinge said screw for locating the rabbet on said insert-strip member in line with said rabbets on said main block-sections, the other of said insert-strip members being provided with an opening permitting lengthwise adjustment thereof with relation to its mating insert-strip member.

5. In combination, a pair of main block-sections, each of which comprises a primary block, a supplemental block and an insert-strip or strips, said main block-sections each provided with a rabbet, an extensible insert-strip comprising a pair of members each of which is provided with an inwardly extending shank, a screw for clamping said extensible insert-strip members and said main block-sections together, the outer edge of one of said members provided with a rabbet at its upper edge, said last-named member provided with a bottomless slot whose side walls are arranged to be positioned by said screw for locating said last-named rabbet in line with said first-named rabbets, and the shank of the other of said members provided with a bottomless opening received over said screw for lengthwise adjustment of said last-named member.

In testimony whereof, I have hereunto signed my name in the presence of two subscribing witnesses.

FREDERICK H. BEROLD.

Witnesses:
OTTO A. GOETZEL,
G. S. HAWKE.

Copies of this patent may be obtained for five cents each, by addressing the "Commissioner of Patents, Washington, D. C."